United States Patent [19]

McAllister et al.

[11] Patent Number: 4,756,057
[45] Date of Patent: Jul. 12, 1988

[54] METHOD OF MAKING HIGH COHERENCY SHIRRED CASING

[75] Inventors: Merlan E. McAllister, Clarendon Hills; Robert W. Snedeker, Downers Grove, both of Ill.

[73] Assignee: Viskase Corporation, Chicago, Ill.

[21] Appl. No.: 903,919

[22] Filed: Sep. 5, 1986

Related U.S. Application Data

[62] Division of Ser. No. 283,244, Jul. 17, 1981, Pat. No. 4,649,961.

[51] Int. Cl.⁴ ............................................. A22C 13/02
[52] U.S. Cl. ............................................. 17/45; 17/49
[58] Field of Search .................. 17/49, 41, 42, 33, 34, 17/35, 45; 138/118.1

[56] References Cited

U.S. PATENT DOCUMENTS

| | | | |
|---|---|---|---|
| 3,454,981 | 7/1969 | Martinek | 17/42 |
| 3,461,484 | 8/1969 | Arnold | 17/49 |
| 3,704,483 | 12/1972 | Urbutis et al. | 17/49 |
| 3,869,756 | 3/1975 | Tums | 17/49 |
| 4,210,981 | 7/1980 | Storey | 17/45 |
| 4,550,042 | 10/1985 | Andrae et al. | 17/42 X |

Primary Examiner—Willie G. Abercrombie
Attorney, Agent, or Firm—Roger Aceto

[57] ABSTRACT

A shirred food casing stick with enhanced overall interpleat coherency is produced by imparting a rotational force to the stick as it is shirred, in a direction opposite to the rotational force imparted to the stick by the shirring means.

4 Claims, 2 Drawing Sheets

METHOD OF MAKING HIGH COHERENCY SHIRRED CASING

This application is a division of prior U.S. application Ser. No. 283,244, filed July 17, 1981, now U.S. Pat. No. 4,649,961.

The invention relates to shirred food casing stick articles and a method for making them and more particularly to high coherency sticks wherein overall interpleat coherency in each stick is enhanced by imparting a rotational force to the stick, as it is being shirred, in a direction opposite the rotational force imparted to the stick by the shirring means producing it.

BACKGROUND OF THE INVENTION

The production of present day sausage products evolved historically from the manual stuffing of lengths of animal intestines with meat products to form selected lengths or links of the product for further processing such as smoking, curing, or cooking, or for use or retail sale. In modern sausage product manufacture, flexible tubular synthetic film casings are used extensively by the industry in making such products as frankfurters, link sausage, bologna, salami, various types of wursts, and in the packaging of ground and shredded meats, such as hamburger and poultry.

The casings with which this invention is mainly concerned are those made of synthetic materials which can be shirred to a self-supporting stick, that is to say casing materials with some degree of innate coherency. Such materials, without limiting the generality of the foregoing description, will include regenerated cellulose, cellulose derivatives, amylose, alginates, collagen, microporous plastic films, and films of polyethylene and polyvinylidene chloride, amongst others, the preferred materials being regenerated cellulose and the derivatives of cellulose. The tubing flat widths range from about 20 millimeters to about 33 millimeters, and tubing wall thickness are from about 1.06 mils to about 1.21 mils.

For convenience in handling, packaging, storing, transporting and utilization, relatively long lengths of tubing from about 10 to about 50 meters or more, are presently shirred and compressed into short lengths or sticks of about 15 to about 60 centimeters in length. Early on in the trade, these synthetic casings were hand shirred, albeit in somewhat shorter overall casing lengths, using hand shirring techniques such as had been traditionally used for shirring the natural or animal intestines casings.

This axial shortening or shirring of the casings is accomplished basically by the multiple folding or pleating of the tubing walls in a more or less accordion-like fashion by gathering an inflated tubing into pleats and then applying axial compressive force to pack the pleats into a tight interlocking coherent structure. Known methods of machine shirring comprehend passing the tubing over a hollow mandrel through which air is passed to inflate the tubing, and impinging lugs, cogs, chains, wheels or the like shirring elements on the tubing continuously in the direction of the longitudinal axis of the tubing to pleat it up and compress it against a yieldable restraining force.

The efficient manufacture of high quality casing sticks has developed into an art in itself, following, and sometimes in fact leading, the developments and advances in the ever forward movement of automatic sausage manufacture. Automatic stuffing and linking operations require precisely made sticks of consistently reliable structural integrity to insure against casing failure and consequent shutdown and loss of production. The sticks must be straight, coherent, flexurally stiff, and free from pinholes and structural deficiencies which could cause breakage during stuffing. It is additionally important that the sticks have sufficiently large and smooth internal bores to facilitate high speed stuffing on modern automatic stuffing equipment.

The criteria against which successful fabrication of shirred casing sticks is measured are:
(a) no damage to the tubing material,
(b) the finished stick is straight,
(c) the stick is coherent, i.e., it resists crushing or breaking under handling and packing stresses,
(d) the stick deshirrs evenly and smoothly with constant applied stuffing force,
(e) the stick is economically manufactured, and
(f) it can be consistently and reproducibly made to preselected standards.

Efforts to attain these goals and meet the criteria of successful shirred casing stick production have produced many technically advanced shirring techniques and apparatus as epitomized, for example, in the U.S. Pat. Nos. 3,779,284 to Tums, 3,695,901 to Winokur, 3,704,483 to Urbutis et al. and 3,461,484 to Arnold, all of which are illustrative of the general state of the prior art relative to the present invention. More recent developments are reflected in the shirring modes described in U.S. Pat. Nos. 3,988,804 to Regner et al, and 4,210,981 to Story.

COHERENCY AND COHERENCY TEST METHOD

One of the most significant factors in the above-described goals and criteria is the quality of coherency, the durability or coherency of the shirred stick as a self-sustaining article being especially important in effecting the suitability of such sticks for use with automatic food stuffing equipment, as, for example, the machinery employed in the preparation of products such as frankfurters and the like food articles. A disjoinder or break in a shirred stick prior to mounting it on a stuffing horn makes the stick completely unsuitable for use on such automatic stuffing equipment. Accordingly, any treatment of the tubular food casing which may be formed into a shirred casing stick must not only not detrimentally effect the coherency but should be directed more towards enhancing it. This invention improves the coherency of the stick by applying a supernumerary rotational force opposite in rotational direction to and at least not substantially less in rotational frequency than the fundamental or basic rotational force imparted to the casing by the shirring device.

In the shirring practice prior to the present invention, it is common practice to rotate the shirred stick in the same direction being imparted to the stick by the shirring rolls, but at an accclerated rate. The shirring rolls impart a twist to the stick having a rotational frequency of 1 to 2 revolutions for each 84 feet of casing length shirred. The current practice prior to the time of the present invention is to increase this roll-imparted stick rotation to a frequency of 1 revolution per 5 to 10 feet of casing length.

With the present invention, stick coherency is increased by altering the shirring operation so that the supernumerary rotation applied, by whatever mechanism used, is in an opposite direction to the rotation imparted to the stick by the shirring device, and at a rotational frequency at least not substantially less than, usually about equal to, and sometimes greater than that heretofore customarily used. This inventive shirring technique produces a coherent self-sustaining stick of shirred and compressed flexible tubular casing comprising a pattern of shirred pleats wherein the major pleat follows a substantially continuous helical locus and the casing has a superimposed progressive helical twist from end to end in the same direction as the helical locus.

Coherency of a casing stick is determined by measuring the bending moment in inch-pounds at the breaking of a stick. A casing stick is cradled on two V-notched support brackets secured on a base plate and spaced apart a distance (D) about 80% to 90% of the length of the casing stick being tested. A pressure member having V-notched struts spaced apart a distance of D less 4 inches is centrally lowered onto the top of the casing stick. A downward pressure is provided by manually operated handle, rack and pinion linkage to a force gauge (such as Hunter Force Indicator, Model L-IM with a "Hold at Maximum Device") that is secured centrally to the pressure member. The force is increasingly applied until the casing stick breaks. The force reading P in pounds is noted. The bending moment in inch-pounds at break on the apparatus is equal to P/2×2 inches, and thus the force reading P equates to inch-pounds of bending moment to break the casing stick. In general, a coherency of at least about 1.0 inch-pound is required and a coherency of at least about 2.5 inch-pounds is especially suitable and preferred.

GENERAL DESCRIPTION AND OBJECTS OF THE INVENTION

Up to the time of the present invention, while significant advances have been made towards improving stick coherency, there still remained room for significant improvement in this attribute and quality of shirred casings sticks.

With this then being the state of the art, the present invention was conceived and developed to provide a novel and unique method of shirring flexible tubing of cellulose or the like material into sticks having a significantly higher coherency than heretofore attained, and to the sticks manufactured in accordance with the method as articles in and of themselves.

It is an object of the present invention to provide a shirred tubular food casing stick suitable for encasing and processing of selected food products which is physically rugged and yet is readily released from its shirred condition in the course of the stuffing operation without any damage or detrimental effect on the casing itself.

Another and the principal object of the invention is to provide shirred artificial casing sticks with extraordinarily higher coherency than heretofore attained in the art, and also to provide the method and apparatus for producing such highly coherent casing sticks.

It is a further and important object of this invention to provide a highly coherent shirred artificial casing stick with the structural integrity necessary to withstand handling of the stick in the customers' plants during loading, handling, storing, and dispensing of the individual sticks on the stuffing equipment.

These and other objects and features of the invention will become the more readily apparent from the ensuing more detailed description and from the drawing wherein.

In general, the invention comprehends a coherent self-sustaining stick of shirred and compressed flexible tubular casing comprising a pattern of shirred pleats formed along a substantially continuous first helical locus, said pleats being angularly displaced from each other along a continuous second helical locus, both first and second helical loci progressing from end to end of said shirred stick in the same direction of helical progression.

The invention additionally comprehends a coherent self-sustaining stick of shirred and compressed flexible tubular casing comprising a pattern of shirred pleats including a major pleat, wherein the major pleat follows a substantially continuous helical locus and the casing has a superimposed progressive helical twist from end to end in the same direction as the helical locus.

The casing material which is comprehended by the present invention is a material selected from the group consisting of regenerated cellulose, cellulose derivatives, amylose, alginates, collagens, microporous plastic films, polyethylene, and polyvinylidene chloride films, the most widely used material of this group being regenerated cellulose or one of the cellulose derivatives.

The casing size range comprehended by the present invention is all tubular casings having flat widths in the range of from about 20 mm to about 33 mm and with casing wall thicknesses of from about 1.06 mils to about 1.21 mils.

The method according to the invention involves the application to the casing as it is being shirred of a supernumerary rotational force which is always opposite in rotational direction to the basic rotational force imparted by the shirring device to the casing as it is shirred.

The invention also includes a method for producing a coherent self-sustaining stick of shirred and compressed flexible tubular casing which comprises, shirring the casing to form a basic helical pleat pattern, and progressively twisting the casing from end to end in the same direction as the basic helical pleat pattern.

DETAILED DESCRIPTION OF THE INVENTION

Figure 1:
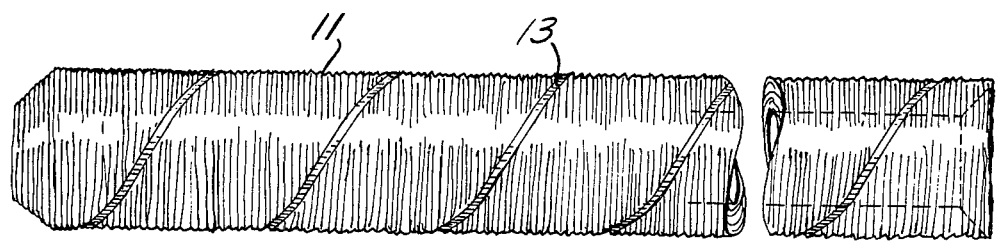
FIG. 1 is a representation of a casing stick according to the invention, shown partly broken away along its length in order to illustrate the configuration of both ends.

Referring to the drawing, FIG. 1 illustrates a shirred stick 11 of casing embodying the invention, part being broken away. The stick represented in FIG. 1 is produced from a flattened tubing stock having a longitudinal stripe 13 commonly used in the industry for product identification. The stripe 13 helically traces the displacement of pleats caused by the rotational relationship of the casing and the holdback mechanism against and through which the casing is shirred. The stripe 13 as shown in FIG. 1 of the drawing appears on the shirred stick as a continuous spirally wound pattern. In the normal operation of shirring apparatus prior to the time of this invention, there was usually imparted to the shirred stick or the stick undergoing the shirring process, a powered twist in the same rotational direction as the twist imparted to the stick by the shirring rolls. The twist or rotation imparted to a stick by the shirring rolls is from about 1 to about 2 revolutions for every 25 to 26 meters of casing shirred. The powered twist normally effects a total or combined twist of 1 revolution for every 1.5 to 3 meters of casing length. The apparatus or device to impart a power twist can be an annular passage about the mandrel of approximately the same diameter as the shirred stick. The device can be used to impart the necessary force to the shirred stick and can then be rotated causing the shirred stick to rotate. An alternative method is to rotate the mandrel upon which the shirred pleats are being formed, the frictional force of the shirred stick contacting the mandrel causing the shirred stick to consequently rotate. Another method of effecting the rotation is to rotate the shirring mechanism and the flat tubular casing as it is fed into the shirring apparatus and maintain the shirred stick angular position fixed while the feed end is rotated accordingly.

Figure 2:
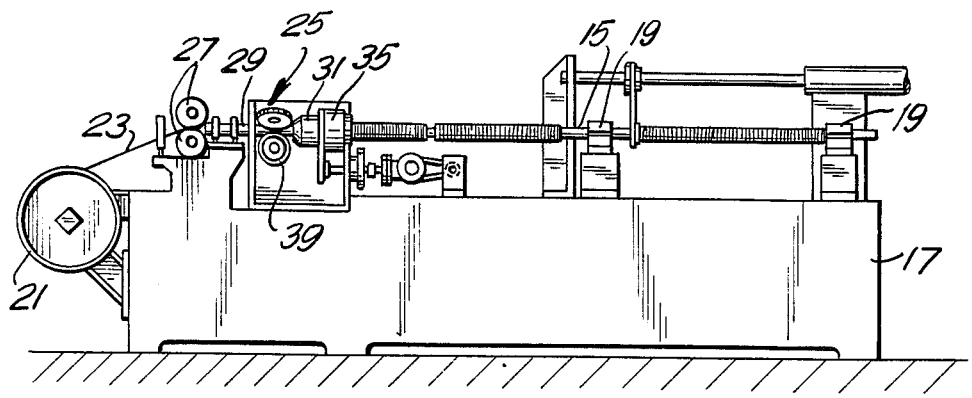
FIG. 2 is a vertical elevation of a shirring apparatus suitable for use in producing a casing stick according to the invention.
Figure 3:
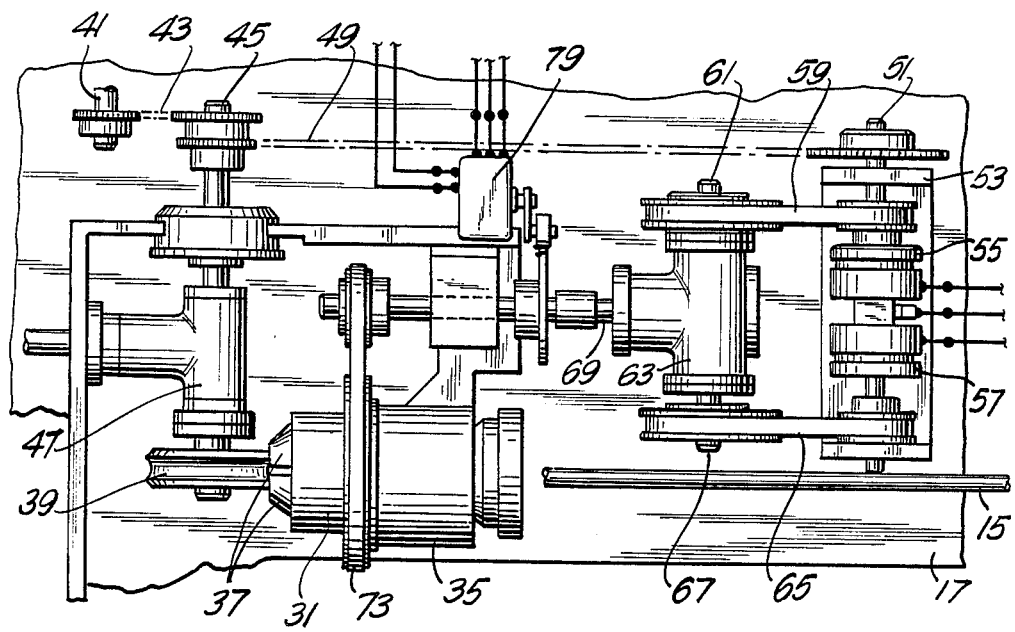
FIG. 3 is a top or plan view of a portion of the apparatus of FIG. 2.

FIGS. 2 and 3 of the drawing illustrate an apparatus embodiment suitable for producing a casing stick according to the present invention. FIG. 2 shows a hollow mandrel 15 supported on a frame 17 by a pair of openable clamps 19. A supply reel 21 of flattened tubular casing 23 is mounted at the opposite end of frame 17. A shirring assembly 25 is secured on the frame 17 between the supply reel 21 and the mandrel supporting clamps 19. Upstream, or ahead of the shirring assembly 25 is a pair of feed rolls 27 for feeding the casing onto the mandrel 15. Air from a source not snown is supplied through the mandrel 15 to inflate the casing 23 as shown at 29 before it enters the shirring assembly 25. The feed rolls 27 are pressurized to provide a nip, preventing inflation of the casing between the feed rolls 27 and the supply reel 21. Mounted on the frame 17 adjacent the shirring assembly 25 is a holdback chuck 31 against which the inflated casing 29 is shirred.

As shown in an enlarged detail in FIG. 3 of the drawing, the holdback chuck 31 is rotatably mounted in a bearing block 35 which is secured to the frame 17 so that the holdback chuck 31 can be rotated about the mandrel 15. The holdback chuck 31 has a set of gripping jaws 37 which grip the casing and permits shirred casing to pass through the holdback chuck and out onto the mandrel 15, and which are operatively closed on the shirred casing to impart the supernumerary rotational force thereto in accordance with the invention. The bearing block 35 is positioned adjacent the shirring assembly 25, one shirring roll 39 thereof being clearly illustrated in FIG. 2 in side view and in top view in FIG. 3. The shirring assembly 25, including the roll 39, other rolls not being fully illustrated, is driven from a main drive shaft 41 through a sproket drive 43 and a subdrive shaft 45 operating through a gear box 47 secured on the frame 17.

Reversible rotation of the holdback chuck 31 is provided as follows. A sprocket drive 49 associated with the shirring subdrive shaft 45 is connected at one end to a clutch shaft 51 journeled on a base 53 upon which are also mounted two electric clutches 55, 57. From one clutch 55, a belt drive 59 is connected to an input shaft 61 on one side of an angle gear drive 63, and from the other clutch 57, a similar belt drive 65 is connected to an input shaft 67 on the other side of the angle gear drive 63. An output shaft 69 from the angle gear drive 63 drives the holdback chuck 31 through a belt drive 73. The control switch 79 is connected into an electric power supply circuit with appropriate circuitry to facilitate the selective utilizations of either of the electric clutches 55, 57, permitting selective operation of the shirring step in either rotational direction through the angle gear drive 63 in accordance with which of the electric clutches is operated.

The foregoing description with reference to the drawing figures indicates the way in which a power twist can be applied to the casing according to the invention. The actual gripping jaws of the rotating chuck driven through the angle drive and whichever of the electric clutches is selected will impart the desired power twist to the shirred casing stick as it is being shirred. In addition to rotating the shirred stick in accordance with the foregoing description, an alternative method is to rotate the mandrel upon which the shirred pleats are being formed, the frictional force of the shirred stick contacting the mandrel causing the shirred stick itself to rotate. A further alternative mode of effecting the desired twist is to rotate the shirring assembly 25 together with feed rolls 27, supply reel 21 and unshirred casing 23, all disposed ahead of the shirred casing, as the casing is being shirred, and maintain the stick in fixed angular position, thus having the power twist imparted at the shirring head itself. A further advantageous mode of producing sticks according to the invention is to rotate the shirred stick in the normal direction and reverse the helix angle direction of the shirring rolls by installing opposite hand rolls. This method does not affect twist-linking on the widely used Frank-A-Matic frankfurter stuffing equipment.

In any case, it is only essential that the availability of the apparatus be to permit rotating the shirred stick in the direction opposite to the direction of the rotation imparted to the stick itself by the shirring rolls during shirring.

EXAMPLE I

Cellulose casing was shirred on a shirring machine equipped to rotate the stick clockwise (standard) or counterclockwise (reverse), and coherency tests were conducted within one day of shirring, again on selected samples at 3 months after shirring, and again on selected samples at 5 months in the coherency test manner described hereinabove.

Casings of various sizes were shirred, alternating the direction of the stick rotation with every stick tested. The application of counter-rotational forces, that is to say where the supernumerary force is in a rotational direction opposite to the rotation imparted to the casing stick by the shirring rolls, always resulted in higher stick coherency. Casing sizes and lengths shirred, along with the coherencies measured and the coherency increase percentages are listed below in Table 1. All casing sticks in this example were prepared with a supernumerary force having a rotational frequency of about 1 revolution per 10 feet of casing length, and a rotation imparted by the shirring rolls of about 1 or 2 revolutions per 84 feet of casing length.

TABLE 1

| Average Casing Flat Width Inches | Casing Length Feet | Standard Product Coherency | Counter-rotation Coherency | Coherency Increase, % |
|---|---|---|---|---|
| .80 | 55 | 0.84 | 1.22 | 45.2 |
|  |  | 0.86 | 1.23 | 43.0 |
| .96 | 84 | 1.65 | 1.91 | 15.8 |
|  | 100 | 1.70 | 2.27 | 33.5 |
|  | 110 | 1.60 | 2.27 | 41.9 |
| 1.14 | 95 | 3.18 | 3.89 | 22.3 |

TABLE 1-continued

| Average Casing Flat Width Inches | Casing Length Feet | Standard Product Coherency | Counter-rotation Coherency | Coherency Increase, % |
|---|---|---|---|---|
| | 95 | 3.09 | 4.21 | 36.2 |
| | 160 | 2.57 | 3.81 | 48.2 |
| 1.30 | 95 | 4.50 | 5.68 | 26.2 |
| | | After 3 Mos. | | |
| 1.14 | 95 | 3.02 | 3.93 | 30.1 |
| | | After 5 Mos. | | |
| .96 | 84 | 2.48 | 2.92 | 17.7 |

EXAMPLE II

Cellulose casing having an average flat width of 0.96 inch was shirred in 84 foot lengths to final stick lengths of 12 inches using opposite hand shirring rolls which generate an implied helix angle on the casing opposite conventional practice. Again the direction of stick rotation was varied with each individual stick. Counter-rotational relationship between the twist imparted by the shirring rolls and the supernumerary rotational force similarly resulted in higher coherency as set forth in the data in the following table, Table 2, with coherency measured first within one day of shirring and again at five months after shirring. All casing sticks in this example were prepared with a supernumerary force having a rotational frequency of about 1 revolution per 10 feet of casing length, and a rotation imparted by the shirring rolls of about 1 or 2 revolutions per 84 feet of casing length.

TABLE 2

| Same Direction Of Rotation Coherency | Counter-rotation Coherency | Coherency Increase, % |
|---|---|---|
| 1.45 | 1.85 | 27.6 |
| | After 5 Months | |
| 2.23 | 2.92 | 30.9 |

EXAMPLE III

Casing having an average flat width of 1.15 inches was shirred, in three modes, (i) standard, (ii) varying stick rotation from clockwise to counter-clockwise in accordance with the technique described in U.S. Pat. No. 3,779,284, and (iii) counter-rotation in accordance with the present invention, to show, in accordance with the data in Table 3, below, that shirring in accordance with the present invention yields the greatest coherency. All casing sticks in this example were prepared with a supernumerary force having a rotational frequency of about 1 revolution per 10 feet of casing length, and a rotation imparted by the shirring rolls of about 1 or 2 revolutions per 84 feet of casing length.

TABLE 3

| Standard Product Coherency | Coherency With U.S. Pat. No. 3,779,284 Shirring | Counter-rotation Coherency |
|---|---|---|
| 2.04 | 2.32 | 2.61 |

This example further illustrates the advantages of the subject invention in producing higher coherencies which are of benefit during manufacturing, transporting, and handling of the casing sticks in the packing plant.

The foregoing description is intended to be illustrative only, it being understood that persons conversant with the art will, in the light of this disclosure, quite possibly develop alternative embodiments and modes of practicing the invention, albeit within the spirit and scope of the invention. The disclosure should not therefore be construed in any limiting sense, it being intended to define the invention in accordance with the appended claims.

What is claimed is:

1. In a method of making a coherent self-sustaining shirred stick composed of a length of tubular casing by shirring the tubular casing to form pleats along a substantially continuous first helical locus wherein the shirring develops and applies a basic rotational force tending to rotate the shirred stick about its longitudinal axis in a direction opposite to the direction of the first helical locus, the improvement comprising:
   applying to the stick as it is being shirred a supernumerary rotational force which is always opposite in rotational direction to said basic rotational force, thereby
   displacing the pleats from each other along a second helical locus which extends in the same direction as said first helical locus, and
   the supernumerary force having a rotational frequency greater than the rotational frequency of said basic rotational force.

2. A method of making a coherent self-sustaining shirred sitck composed of a length of tubular casing by
   (a) shirring the tubular casing to form a pattern of shirred pleats including a major pleat which follows a substantially continous helical locus extending from one end of the stick to the other; and
   (b) during shirring, continously twisting the stick from end-to-end in the same direction as the helical locus of the major pleat at a rotational frequency of about one revolution per each 5 to 20 feet of tubular casing.

3. The method according to claim 1 wherein the rotational frequency of the supernumerary rotational force is in the range of 1 revolution per 5 to 20 feet of casing length.

4. The method according to claim 1 wherein the rotational frequency of the supernumerary rotational force is about 1 revolution per 10 feet of casing length, and the rotational frequency of the basic rotational force is about 1 to 2 revolutions per 84 feet of casing length.

* * * * *